United States Patent
Oliveira Almeida et al.

(10) Patent No.: US 11,977,861 B2
(45) Date of Patent: May 7, 2024

(54) SYSTEMS AND METHODS FOR EMBEDDING A COMPUTATIONAL NOTEBOOK

(71) Applicant: Kinaxis Inc., Ottawa (CA)

(72) Inventors: Marcio Oliveira Almeida, Ottawa (CA); Zhen Lin, Ottawa (CA); Chantal Bisson-Krol, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 17/103,320

(22) Filed: Nov. 24, 2020

(65) Prior Publication Data

US 2022/0164167 A1 May 26, 2022

(51) Int. Cl.
*G06F 9/44* (2018.01)
*G06F 8/36* (2018.01)
*G06F 9/48* (2006.01)
*G06N 20/00* (2019.01)

(52) U.S. Cl.
CPC .............. *G06F 8/36* (2013.01); *G06F 9/4843* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,359,658 B2 | 1/2013 | Jacob et al. | |
| 9,990,230 B1* | 6/2018 | Stoica | G06F 9/4887 |
| 10,002,163 B2 | 6/2018 | Shuster et al. | |
| 10,282,450 B1 | 5/2019 | Shuster et al. | |
| 10,678,536 B2 | 6/2020 | Hunter et al. | |
| 10,938,641 B1* | 3/2021 | Fritz | G06F 9/455 |
| 2017/0289269 A1* | 10/2017 | Bell | G06F 16/00 |
| 2020/0142725 A1* | 5/2020 | Resende | G06F 9/45558 |
| 2020/0151272 A1* | 5/2020 | Freitag | G06F 16/29 |
| 2020/0218588 A1* | 7/2020 | Sarid | G06F 9/451 |
| 2020/0364606 A1* | 11/2020 | Sawant | G06F 8/36 |
| 2020/0380001 A1* | 12/2020 | Shuster | G06F 8/313 |
| 2021/0110288 A1* | 4/2021 | Poothiyot | G06F 8/20 |
| 2022/0043680 A1* | 2/2022 | Ferreira | G06F 9/5011 |
| 2022/0058334 A1* | 2/2022 | Joshi | G06F 8/73 |

OTHER PUBLICATIONS

Hu et al., Embedding containerized workflows inside data science notebooks enhances reproducibility (Year: 2018).*
International Search Report for PCT/CA2021/051619 dated Jan. 26, 2022, 3 pages.

(Continued)

*Primary Examiner* — Insun Kang
(74) *Attorney, Agent, or Firm* — Borden Ladner Gervais

(57) ABSTRACT

Systems and methods for embedding a computational notebook within an enterprise application software. A computational notebook editor embedded is embedded within a software client interface which is in communication with the software client interface. The application server comprises a reverse proxy server that is embedded within the application server. A container management system is in communication with the application server and comprises a multi-user server, a notebook interactive development environment, and a notebook execution tool.

15 Claims, 8 Drawing Sheets

(56) References Cited

OTHER PUBLICATIONS

De Feo, "Deploying a Containerized Jupyterhub Server with Docker", OpenDrearnKit, Oct. 17, 2018 (Oct. 17, 2018); Entire Document; Retrieved from the Internet: https://opendreamkit.org/2018/10/17/jupyterhub-docker/.

Fabbiani, "Stop copy-pasting notebooks, embrace Jupyter templates!", Towards Data Science, Feb. 5, 2020 (Feb. 5, 2020); Entire Document; Retrieved from the Internet: https://towardsdatascience.com/stop-cop-pasting-notebooks-embrace-jupyter-templates-6bd7b6c00b94.

Lau et al., "The Design Space of Computational Notebooks: An Analysis of 60 Systems in Academia and Industry", 2020 IEEE Symposium on Visual Languages and Human-Centric Computing (VL/HCC), Aug. 14, 2020 (Aug. 14, 2020); pp. 1-3; Retrieved from the Internet: https://ieeexplore.ieee.org/ document/9127201.

\* cited by examiner

| | Part Name | Date | Part Site | Quantity |
|---|---|---|---|---|
| 1 | AC-0201 | 1-May-2011 | HQ | 3,656 |
| 2 | AC-0201 | 1-Jun-2011 | HQ | 3,109 |
| 3 | AC-0201 | 1-Jul-2011 | HQ | 2,467 |
| 4 | AC-0201 | 1-Aug-2011 | HQ | 3,392 |
| 5 | AC-0201 | 1-Sep-2011 | HQ | 2,549 |
| 6 | AC-0201 | 1-Oct-2011 | HQ | 2,773 |
| 7 | AC-0201 | 1-Nov-2011 | HQ | 3,331 |
| 8 | AC-0201 | 1-Dec-2011 | HQ | 3,293 |
| 9 | AC-0201 | 1-Jan-2012 | HQ | 4,693 |
| 10 | AC-0201 | 1-Feb-2012 | HQ | 4,637 |
| 11 | AC-0201 | 1-Mar-2012 | HQ | 4,733 |
| 12 | AC-0201 | 1-Apr-2012 | HQ | 5,062 |
| 13 | AC-0201 | 1-May-2012 | HQ | 3,722 |
| 14 | AC-0201 | 1-Jun-2012 | HQ | 3,088 |
| 15 | AC-0201 | 1-Jul-2012 | HQ | 3,168 |

FIG. 4

| | Part Name | Date | Part Site | Quantity |
|---|---|---|---|---|
| | AMP001 ▼ | ▼ | ▼ | ▼ |
| 1 | AMP001 | 1-Jun-2014 | SOPCM3 | 595 |
| 2 | AMP001 | 1-Jul-2014 | SOPCM3 | 589 |
| 3 | AMP001 | 1-Aug-2014 | SOPCM3 | 595 |
| 4 | AMP001 | 1-Sep-2014 | SOPCM3 | 639 |
| 5 | AMP001 | 1-Oct-2014 | SOPCM3 | 620 |
| 6 | AMP001 | 1-Nov-2014 | SOPCM3 | 645 |
| 7 | AMP001 | 1-Dec-2014 | SOPCM3 | 634 |
| 8 | AMP001 | 1-Jan-2015 | SOPCM3 | 647 |
| 9 | AMP001 | 1-Feb-2015 | SOPCM3 | 680 |
| 10 | AMP001 | 1-Mar-2015 | SOPCM3 | 639 |
| 11 | AMP001 | 1-Apr-2015 | SOPCM3 | 648 |
| 12 | AMP001 | 1-May-2015 | SOPCM3 | 674 |
| 13 | AMP001 | 1-Jun-2015 | SOPCM3 | 670 |
| 14 | AMP001 | 1-Jul-2015 | SOPCM3 | 672 |
| 15 | AMP001 | 1-Aug-2015 | SOPCM3 | 699 |

FIG. 7

SYSTEMS AND METHODS FOR EMBEDDING A COMPUTATIONAL NOTEBOOK

TECHNICAL FIELD

The present disclosure relates to software development environments. In particular, it relates to computational notebook environments.

BACKGROUND

Computational notebooks, which provide a virtual notebook environment, have become widely popular, allowing users to analyze data and present findings. Computational notebooks can be used in diverse fields such as science, education, and business intelligence. While a number of proprietary notebooks have been launched, free/open-source notebooks have proven to be even more popular. Examples of the latter include Apache Spark™, SageMath™ and Jupyter™.

In addition, enterprise application software (EAS) serves a variety of needs of organizations, often providing business-oriented tools. Enterprise computing provide organizations tools to efficiently manage operations and support. Enterprise applications allow for the display, manipulation, and storage of large amounts of complex data, along with the automation of business processes in conjunction with that data.

It would be beneficial to combine an open-source notebook with an EAS, thereby allowing EAS users to access all of the advantages provided by computational notebooks—such as simplicity of data processing and ease of presentation.

One way to combine a computational notebook with an EAS is to have the notebook external to the EAS. In order to access data associated with the EAS, a user is required to access an API that retrieves relevant data from the EAS, for use by the notebook. However, this approach has a number of drawbacks. The user experience is not seamless since a user needs to switch between different applications. In addition, there are security risks: in order for the notebook to access the API, the notebook needs the user's credentials, which will be exposed in the notebook. In addition, the notebook is not stored, nor maintained, in the EAS-secured environment. Furthermore, it will not be feasible to run the notebook offline since the notebook will not be accessible by the EAS. It will also not be possible to schedule execution of the notebook that is triggered by an event in the EAS. Finally, sharing and reusing the notebooks become cumbersome as the authorization and authentication processes will not be controlled by EAS.

There is therefore a need to embed a computational notebook within an EAS. By doing so, there is a seamless user experience by accessing only one user interface. Furthermore, all of the authentication and authorization are handled by the EAS. In addition, the computational notebooks are stored and accessed in the secure environment of the EAS. Sharing and reusing notebooks by users of the EAS is easier since the EAS handles all of the permissions. However, embedding a computational notebook within the infrastructure of an EAS is not technically straightforward.

BRIEF SUMMARY

In order to embed a computational notebook within an EAS, a component may be created that binds access to the notebook infrastructure to the EAS. This component makes the notebook seem like part of the EAS. Furthermore, the component acts as a middle-man from which all the communication flows.

Such an arrangement provides and EAS the ability to run a web application as part of the platform, such that the web application allows for working in a notebook computing system environment (i.e. the computational notebook). Such an arrangement can be executed in two modes: interactive and scheduled.

In the interactive mode, a user can interact in real time with the computational notebook by running scripts and generating visualizations. In the scheduled mode, scheduling of the execution of computational notebooks allows a user to run a particular notebook periodically. In addition, combining scheduling with parameterized computational notebooks enables a powerful workflow in which the user can reuse computational notebooks to trigger custom analysis of data.

In one aspect, a system comprising: a computational notebook editor embedded within a software client interface; an application server in communication with the software client interface, the application server comprising a reverse proxy server that is embedded within the application server; a container management system in communication with the application server, the container management system comprising a multi-user server, a notebook interactive development environment, and a notebook execution tool. In some embodiments, the software client interface is an enterprise software client interface.

In some embodiments of the system, the computational notebook editor accesses the notebook interactive development environment mode via the reverse proxy. In some embodiments, the computational notebook editor is used to create one or more notebook templates. In some embodiments, the notebook execution tool is used for a scheduled execution of one or more notebook templates created by the computational notebook editor. In some embodiments, the notebook execution tool parametrizes the one or more notebook templates. In some embodiments, the notebook execution tool creates a workflow for execution of one or more computational notebooks.

In another aspect, a computer-implemented method comprising: embedding a computational notebook editor within a software client interface; embedding a reverse proxy with an application server, the application server in communication with the software client interface; and hosting, by a container management system, a multi-user server; a notebook interactive development environment; and a notebook execution tool, the container management system in communication with the application server.

In some embodiments, the method further comprises: accessing, by the computational notebook editor, the notebook interactive development environment via the reverse proxy. In some embodiments, the method further comprises: creating, by the computational notebook editor, one or more notebook templates. In some embodiments, the method further comprises: scheduling, by the notebook execution tool, a scheduled execution of one or more notebook templates created by the computational notebook editor. In some embodiments, the method further comprises: parametrization, by the notebook execution tool, of the one or more notebook templates. In some embodiments, the method further comprises: creating, by the notebook execution tool, a workflow for execution of one or more computational notebooks. In some embodiments, the software client interface is an enterprise software client interface.

In yet another aspect, a non-transitory computer-readable storage medium, the computer-readable storage medium including instructions that when executed by a computer, cause the computer to: embed a computational notebook editor within a software client interface; embed a reverse proxy with an application server, the application server in communication with the software client interface; and host, by a container management system, a multi-user server; a notebook interactive development environment; and a notebook execution tool, the container management system in communication with the application server.

In some embodiments of the computer-readable storage medium, the instructions further configure the computer to: access, by the computational notebook editor, the notebook interactive development environment via the reverse proxy. In some embodiments, the instructions further configure the computer to: create, by the computational notebook editor, one or more notebook templates. In some embodiments, the instructions further configure the computer to: schedule, by the notebook execution tool, a scheduled execution of one or more notebook templates created by the computational notebook editor. In some embodiments, the instructions further configure the computer to: parametrize, by the notebook execution tool, of the one or more notebook templates. In some embodiments, the instructions further configure the computer to: create, by the notebook execution tool, a workflow for execution of one or more computational notebooks. In some embodiments, the software client interface is an enterprise software client interface.

In some embodiments, the notebook computing system environment allows for live computer code, embedding of visualizations and explanatory text. In some embodiments, the notebook computing system environment is Jupyter™ Notebooks. In some embodiments, the notebook computing system environment is used to: run Data Science and Machine Learning tasks on data, provide visualizations and publish results in a software database with properly secured communication and authentication.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a data table used in an example in accordance with one embodiment.

FIG. 7 illustrates a data table used in an example in accordance with one embodiment.

DETAILED DESCRIPTION

Figure 1:
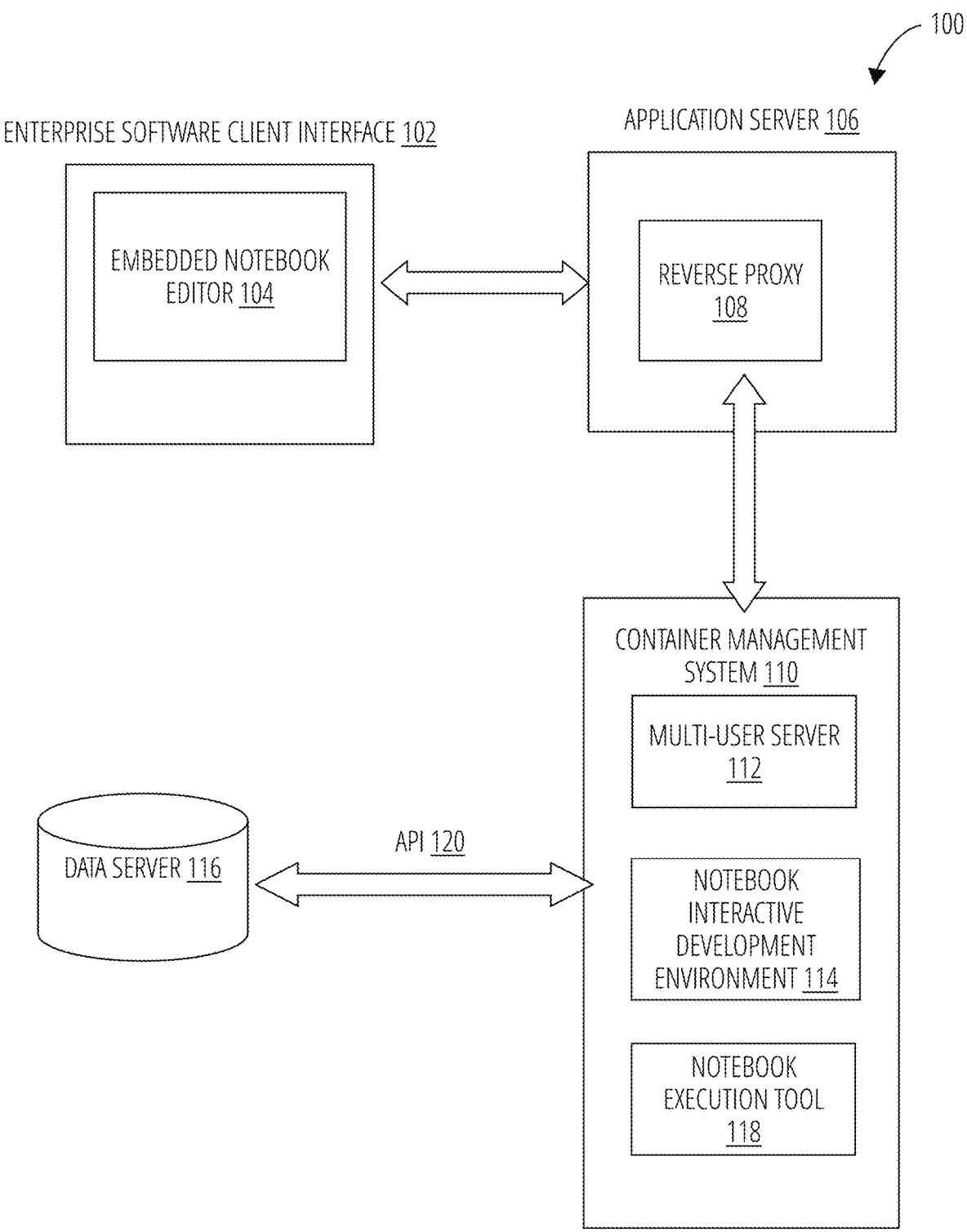
FIG. 1 illustrates a system architecture 100 in accordance with one embodiment.

A computer program (which may also be referred to or described as a software application, code, a program, a script, software, a module, or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device includes a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (e.g. a keyboard, a pointing device such as a mouse or a trackball, etc.). Other kinds of devices can be used to provide for interaction with a user. Feedback provided to the user can include sensory feedback (e.g. visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates a system architecture 100 in accordance with one embodiment.

An embedded notebook editor 104 is embedded within enterprise software client interface 102, and connects the EAS to the notebook interactive development environment 114 via reverse proxy 108 which is embedded within application server 106. The reverse proxy 108 is embedded as a component in the enterprise application, instead of as a separate service. This allows the reverse proxy 108 to seamlessly access all the resources of the enterprise application, since it is the same code. The application server 106 is in communication with a container management system 110 that includes a multi-user server 112, the notebook interactive development environment 114 and a notebook execution tool 118. The multi-user server 112 manages the instances of the notebook interactive development environment 114. The notebook execution tool 118 is used for scheduled execution of computational notebooks.

Results of execution can be stored in data server 116 via API 120. The embedded notebook editor 104 can also provide an environment to run scheduled notebooks, discussed below in FIG. 3.

The embedded notebook editor 104 can extend the EAS with the Data Science and Machine learning capabilities provided by the computational notebook environment.

In one embodiment, the embedded notebook editor 104 is a Jupyter™ Notebook editor, the multi-user server 112 is JupyterHub™, and the notebook interactive development environment 114 is JuptyerLab™ Instance. The container management system 110 can be, for example, Kubernetes™.

The system embodied by system architecture 100 allows for connection of the EAS to the embedded notebook editor 104 which provides an environment for execution and authoring of one or more computational notebooks, including notebook templates, which may be used in the scheduled mode.

A notebook template can be described as follows. A computational notebook describes a linear flow of execution and can construct an entire workflow in a notebook. A notebook template introduces the concept of a parameterized computational notebook which is a computational notebook that allows a user to specify parameters in the code and to accept input values at runtime. This provides a mechanism to define computational notebooks as reusable templates.

Figure 2:
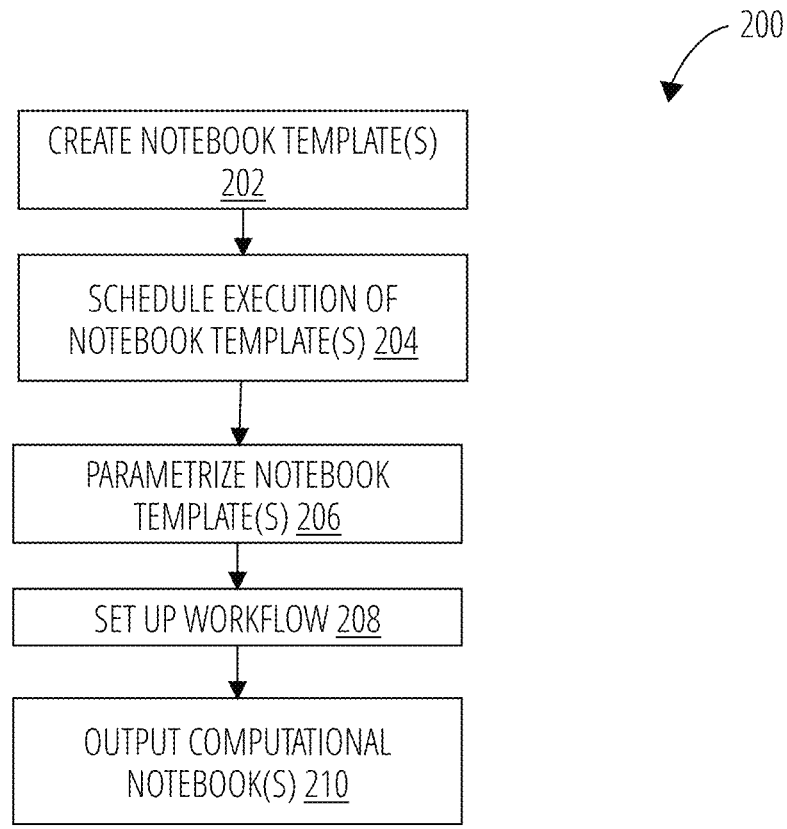
FIG. 2 illustrates a workflow in accordance with one embodiment.

FIG. 2 illustrates a workflow 200 for schedule execution in accordance with one embodiment. The embedded notebook editor 104 creates one or more notebook templates at step 202, which are scheduled for execution at step 204. The notebook execution tool 118 parametrizes the one or more notebook templates at step 206, and can also set up a workflow of subsequent notebook executions at step 208. The computational notebook(s) are then output at step 210.

As discussed above, there are two modes of execution: interactive and scheduled. In the scheduled mode, scheduling of the execution of computational notebooks allows a user to run a particular computational notebook periodically. For example, a user would like to have a report that is executed with different values on the first or last day of a week; or the first or last day of a month; or at the beginning or end of a year. Such execution is facilitated by parametrizing a computational notebook.

In addition, combining scheduling with parameterized computational notebooks enables a powerful workflow in which the user can reuse computational notebooks to trigger custom analysis of data. For example, a user may want to run a computational notebook and depending on its results, choose a particular computational notebook to run next. A workflow can be executed without the need to manually copy and paste from computational notebook to computationally notebook.

Figure 3:
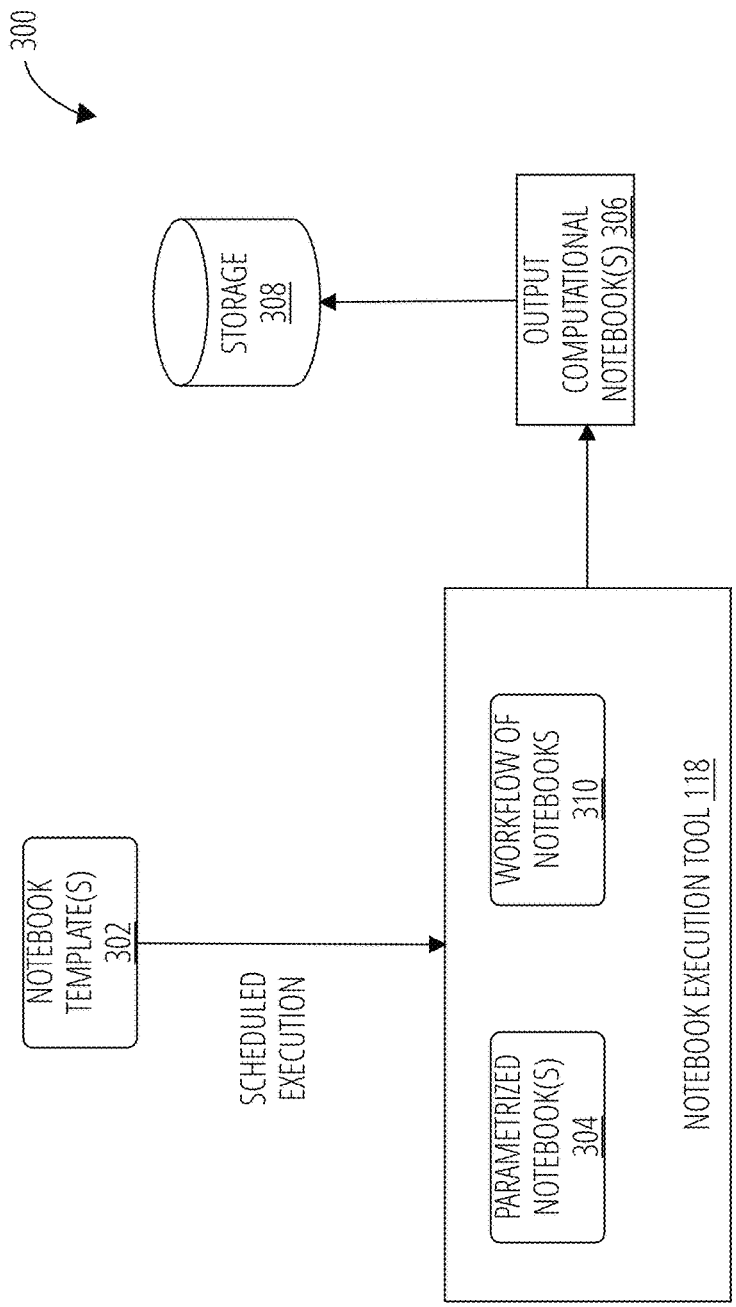
FIG. 3 illustrates a notebook scheduling and execution flow 300 in accordance with one embodiment.

FIG. 3 illustrates a notebook scheduling and execution flow 300 in accordance with one embodiment. One or more notebook template(s) 302 are created by the embedded notebook editor 104, in preparation for a scheduled execution. Notebook execution tool 118 converts the notebook template(s) 302 to parametrized notebook(s) 304, and if specified in the code of the computational notebook, creates a workflow of notebooks 310, which are also executed. The results are output computational notebook(s) 306 which can then be stored in storage 308.

An example of a notebook execution tool 118 Papermill™, which can be used to parameterize and execute Jupyter™ Notebooks.

An example of using the embedded notebook editor 104 (from FIG. 1) in interactive mode, is described as follows, with respect to supply chain data in FIG. 4. The historical data includes, for example, how many units of a particular part were sold at a particular site between the time period of May 2011 and March 2014 on a monthly basis. Data table 400 shown in FIG. 4 lists only the first fifteen entries from the full historical data. A user would like to use this historical time series data to forecast this data, in two ways: monthly; and quarterly.

Since the computational notebook is embedded within the EAS, it can access data that is accessible to the EAS.

Figure 5:
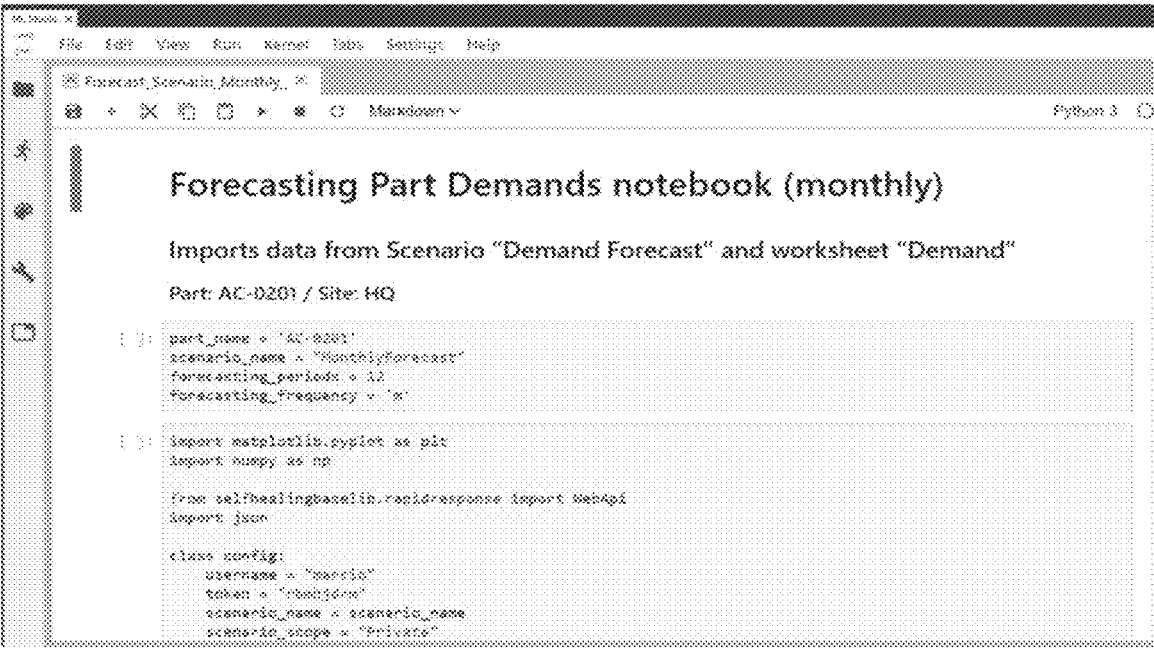
FIG. 5 illustrates two computational notebooks created for forecasting based on data shown in FIG. 4.

The user can author two notebooks, using the embedded notebook editor 104—one for each forecast as shown in FIG. 5. In the embodiment shown in FIG. 5, Jupyter™ Notebooks is used to generate the computational notebooks: one for monthly forecasting 502, and one for quarterly forecasting 504. In each case, the same machine learning model is used to train on the historical data, which in this case is FB Prophet. However, other ML models can be used. A kernel to chosen to execute the code. While different kernels can be used, in the example shown in FIG. 5, Python 3 is used as the kernel, while including certain libraries. Other examples of kernels for execution include R and MATLAB.

Figure 6:
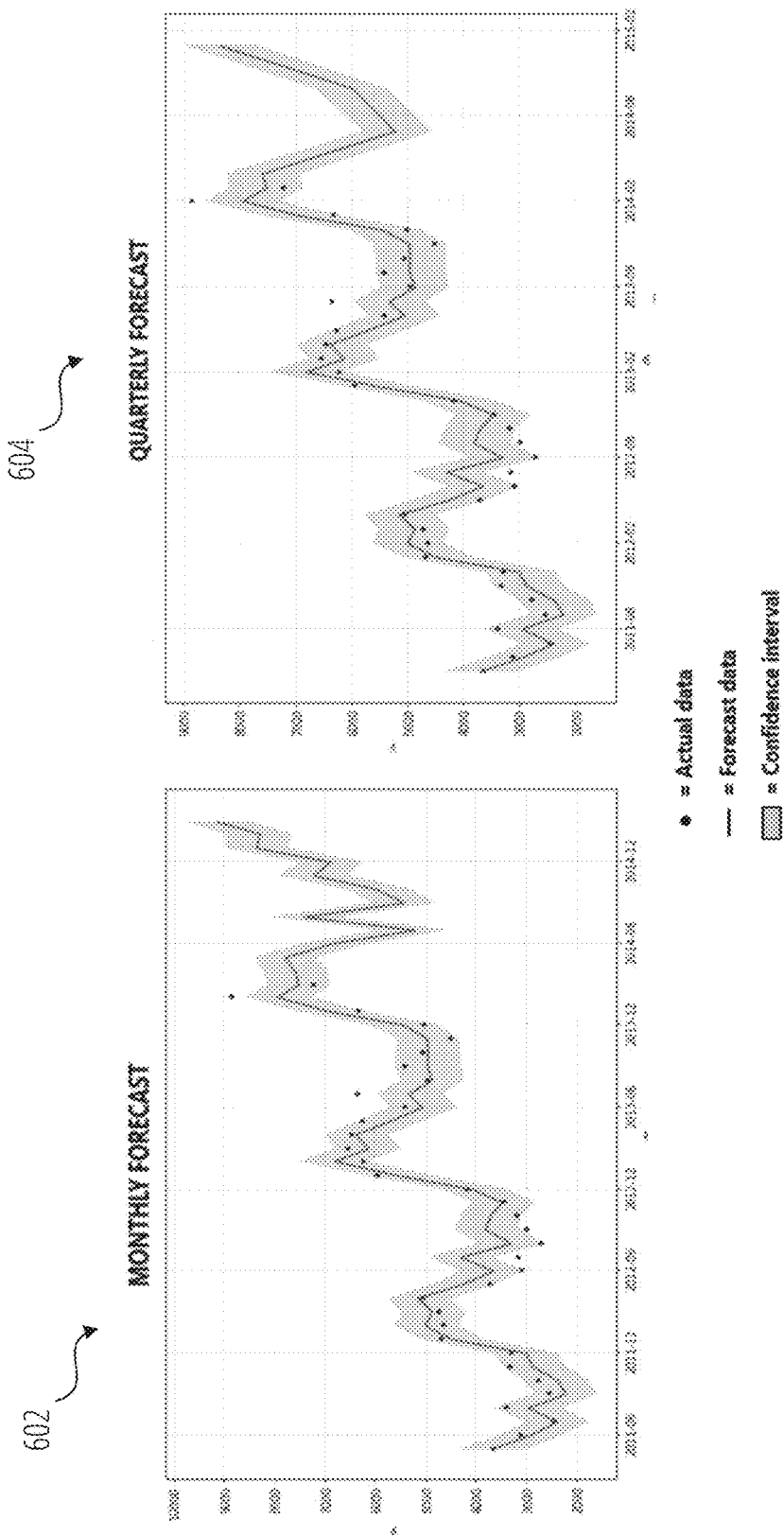
FIG. 6 illustrates monthly and quarterly forecasts using the computational notebooks of FIG. 5.

FIG. 6 illustrates monthly and quarterly forecasts using the computational notebooks of FIG. 5, with monthly forecast 602 and quarterly forecast 604. The dots refer to historical data, while the solid line represents the forecast provided by the machine learning model. The grey shading refers to a confidence interval of the forecast. Not surprisingly, monthly forecast 602 is more granular than quarterly forecast 604 during the forecasting period of April 2013 to March 2014.

An example of using the embedded notebook editor 104 (from FIG. 1) in scheduled mode, is described as follows, with respect to supply chain data in FIG. 7. The historical data includes, for example, how many units of a particular part were sold at a particular site between the time period of June 2014 and May 2017 on a monthly basis. Data table 400 shown in FIG. 6 lists only the first fifteen entries from the full historical data. A user would like to use this historical time series data to forecast this data, in scheduled mode. In the embodiment shown in FIG. 7—FIG. 7, Jupyter™ notebooks is used with PaperMill™ to generate results.

Since the computational notebook is embedded within the EAS, it can access data that is accessible to the EAS.

Figures 8A, 8B:
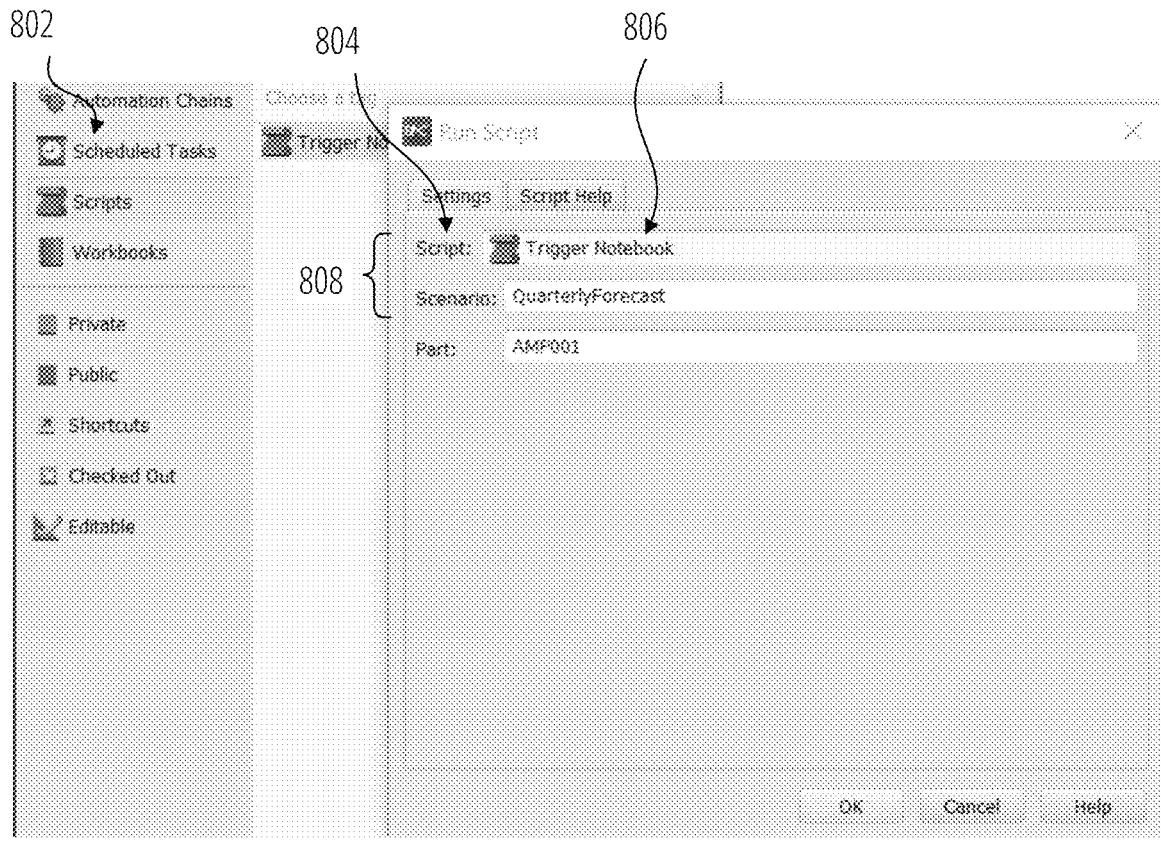
FIG. 8A illustrates a screenshot of the execution of the computational notebook in relation to FIG. 7.
FIG. 8B illustrates a forecast in relation to FIG. 8A.

FIG. 8A illustrates a screenshot of the execution of the computational notebook in relation to FIG. 7. A scheduled task 802 calls a script 804 (called Trigger Notebook 806). Since the computational notebook is embedded within an EAS, the computational notebook can become a script. This computational notebook is parametrized; its parameters 808 are 'Scenario' and 'Part'. 'Scenario' refers to the type of forecast requested by a user. In FIG. 8A, a quarterly forecast has been selected. 'Part' refers to the part number, which is also selected by the user.

FIG. 8B illustrates a quarterly forecast 810 obtained by the scheduled execution of the computational notebook shown in FIG. 8A. The results are shown in tabular form 812 for the time period between Jun. 30, 3017 and Mar. 31, 2018.

In both FIG. 8A and FIG. 8B, the results have been obtained using PaperMill™ which executed the parameterized Jupyter™ notebook.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
a processor; and
a memory storing instructions that, when executed by the processor, configure the system to:
embed a computational notebook editor within a software client interface of an enterprise application, the computational notebook editor configured for authoring one or more computational notebooks;
bind access to the computational notebook editor to the software client interface;
embed, as a component in the enterprise application, a reverse proxy server within an application server in communication with the software client interface, the reverse proxy server and the computational notebook editor being configured with a same code for enabling access therebetween;
access, by the computational notebook editor, a notebook interactive development environment via the reverse proxy server; and
host, by a container management system, the notebook interactive development environment; a multi-user server to manage instances of the notebook interactive development environment; and a notebook execution tool to schedule execution of the one or more computational notebooks, the container management system in communication with the application server.

2. The system of claim 1, wherein the instructions further configure the system to:
create, by the computational notebook editor, one or more notebook templates.

3. The system of claim 1, wherein the instructions further configure the system to:
schedule, by the notebook execution tool, a scheduled execution of one or more notebook templates created by the computational notebook editor.

4. The system of claim 3, wherein the instructions further configure the system to:
parametrize, by the notebook execution tool, the one or more notebook templates.

5. The system of claim 3, wherein the instructions further configure the system to: create, by the notebook execution tool, a workflow for execution of the one or more computational notebooks.

6. A computer-implemented method comprising:
embedding a computational notebook editor within a software client interface of an enterprise application, the computational notebook editor configured for authoring one or more computational notebooks;
binding access to the computational notebook editor to the software client interface;
embedding, as a component in the enterprise application, a reverse proxy server within an application server in communication with the software client interface, the reverse proxy server and the computational notebook editor being configured with a same code for enabling access therebetween;

accessing, by the computational notebook editor, a notebook interactive development environment via the reverse proxy server; and hosting, by a container management system, the notebook interactive development environment; a multi-user server to manage instances of the notebook interactive development environment; and a notebook execution tool to schedule execution of the one or more computational notebooks, the container management system in communication with the application server.

7. The computer-implemented method of claim 6, further comprising:

creating, by the computational notebook editor, one or more notebook templates.

8. The computer-implemented method of claim 6, further comprising:

scheduling, by the notebook execution tool, a scheduled execution of one or more notebook templates created by the computational notebook editor.

9. The computer-implemented method of claim 8, further comprising:

parametrization, by the notebook execution tool, of the one or more notebook templates.

10. The computer-implemented method of claim 8, further comprising: creating, by the notebook execution tool, a workflow for execution of the one or more computational notebooks.

11. A non-transitory computer-readable storage medium, the computer-readable storage medium including instructions that when executed by a computer, cause the computer to:

embed a computational notebook editor within a software client interface of an enterprise application, the computational notebook editor configured for authoring one or more computational notebooks;

bind access to the computational notebook editor to the software client interface;

embed, as a component in the enterprise application, a reverse proxy server within an application server in communication with the software client interface, the reverse proxy server and the computational notebook editor being configured with a same code for enabling access therebetween;

access, by the computational notebook editor, a notebook interactive development environment via the reverse proxy server; and host, by a container management system, the notebook interactive development environment; a multi-user server to manage instances of the notebook interactive development environment; and a notebook execution tool to schedule execution of the one or more computational notebooks, the container management system in communication with the application server.

12. The computer-readable storage medium of claim 11, wherein the instructions further configure the computer to:

create, by the computational notebook editor, one or more notebook templates.

13. The computer-readable storage medium of claim 11, wherein the instructions further configure the computer to:

schedule, by the notebook execution tool, a scheduled execution of one or more notebook templates created by the computational notebook editor.

14. The computer-readable storage medium of claim 13, wherein the instructions further configure the computer to:

parametrize, by the notebook execution tool, of the one or more notebook templates.

15. The computer-readable storage medium of claim 13, wherein the instructions further configure the computer to: create, by the notebook execution tool, a workflow for execution of the one or more computational notebooks.

* * * * *